United States Patent
Ono et al.

(10) Patent No.: US 7,920,295 B2
(45) Date of Patent: Apr. 5, 2011

(54) IMAGE PROCESSING CIRCUIT, DISPLAYING APPARATUS, AND PRINTING APPARATUS

(75) Inventors: Yoshiyuki Ono, Hino (JP); Takashi Sawazaki, Chofu (JP); Akira Saito, Sagamihara (JP)

(73) Assignee: Seiko Epson Corporation, Tokyo (JP)

( * ) Notice: Subject to any disclaimer, the term of this patent is extended or adjusted under 35 U.S.C. 154(b) by 712 days.

(21) Appl. No.: 11/984,522

(22) Filed: Nov. 19, 2007

(65) Prior Publication Data

US 2008/0225341 A1    Sep. 18, 2008

(30) Foreign Application Priority Data

Mar. 16, 2007   (JP) ................. 2007-068294

(51) Int. Cl.
*H04N 1/409* (2006.01)
(52) U.S. Cl. ........ 358/3.27; 358/3.26; 358/1.9; 358/3.2; 382/260; 382/264; 382/266; 382/269; 345/611; 345/613
(58) Field of Classification Search .................... None
See application file for complete search history.

(56) References Cited

U.S. PATENT DOCUMENTS

| | | | | |
|---|---|---|---|---|
| 4,499,498 A | * | 2/1985 | Iinuma | 341/63 |
| 4,937,782 A | * | 6/1990 | Mizugaki et al. | 377/107 |
| 5,250,939 A | * | 10/1993 | Takanashi et al. | 345/204 |
| 5,271,095 A | * | 12/1993 | Yamada | 345/428 |
| 5,345,517 A | * | 9/1994 | Katayama et al. | 382/299 |
| 5,448,654 A | * | 9/1995 | Katayama et al. | 382/298 |
| 5,539,842 A | * | 7/1996 | Schwartz | 382/232 |
| 5,572,606 A | * | 11/1996 | Tanioka | 358/3.08 |
| 5,659,635 A | * | 8/1997 | Komatsu et al. | 382/245 |
| 6,088,124 A | * | 7/2000 | Tanaka | 358/1.9 |
| 6,529,204 B1 | * | 3/2003 | Mikoshiba et al. | 345/597 |
| 6,646,654 B2 | * | 11/2003 | Takagi | 345/690 |
| 7,072,512 B2 | * | 7/2006 | Mehrotra | 382/173 |
| 2005/0068326 A1 | | 3/2005 | Nakahashi et al. | |
| 2005/0100212 A1 | | 5/2005 | Eguchi et al. | |
| 2007/0047032 A1 | * | 3/2007 | Kondo | 358/518 |
| 2007/0104385 A1 | * | 5/2007 | Kobayashi et al. | 382/266 |
| 2007/0126744 A1 | * | 6/2007 | Tsutsumi | 345/520 |
| 2008/0101696 A1 | * | 5/2008 | Noh | 382/168 |

FOREIGN PATENT DOCUMENTS

CN    1126411 A    7/1996

(Continued)

*Primary Examiner* — Mark K Zimmerman
*Assistant Examiner* — Dung D Tran
(74) *Attorney, Agent, or Firm* — Oliff & Berridge PLC

(57) ABSTRACT

An image processing circuit includes: a plurality of counters that extract image blocks each of which includes a predetermined number of pixels from input image data, count a number of pixels having a predetermined value for each of the image blocks, calculate a pixel value for each of the extracted image blocks, and output a plurality of bit streams each of which represents the counted number for a respective image block, the number of the plurality of counters being larger than a bit length defined for a single writing process with the memory divided by the bit length of a value calculated for an image block; a converter that converts the bit streams output from the plurality of counters, by adjusting a bit length of the bit streams for writing in the memory, and outputs the converted bit streams; and a synthesizer that synthesizes the plurality of bit streams output from the converter to generate a bit stream having the bit length defined for a single writing process with the memory, and outputs the generated bit stream.

5 Claims, 6 Drawing Sheets

FOREIGN PATENT DOCUMENTS

| | | |
|---|---|---|
| CN | 1617567 A | 5/2005 |
| JP | A-01-194569 | 8/1989 |
| JP | A-04-365258 | 12/1992 |
| JP | A-07-095391 | 4/1995 |
| JP | A-07-325927 | 12/1995 |
| JP | A-08-328539 | 12/1996 |
| JP | A 2004-287964 | 10/2004 |
| KR | 2005-30569 | 3/2005 |

* cited by examiner

FIG. 3

| INPUT PIXEL VALUES | OUTPUT PIXEL VALUES |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 15 |

| INPUT PIXEL VALUES | OUTPUT PIXEL VALUES |
|---|---|
| 0 | 0 |
| 1 | 1 |
| 2 | 2 |
| 3 | 3 |
| 4 | 3 |

Tb

IMAGE PROCESSING CIRCUIT, DISPLAYING APPARATUS, AND PRINTING APPARATUS

The entire disclosure of Japanese Patent Application No. 2007-68294 filed on Mar. 16, 2007 is expressly incorporated by reference herein.

BACKGROUND

1. Technical Field

The present invention relates to a technique of smoothing images.

2. Related Art

Among image processing techniques there is known a technique of smoothing an image, which is called 'anti-aliasing'. As an example of this technique, a value of a target pixel is calculated on the basis of values of neighboring 16 pixels within a 4*4 matrix; to generate an output image based on pixel values already calculated. In a case that an image includes a character depicted in black and white, anti-aliasing calculates another color(s) between black and white to be used to depict an edge region of the character. Accordingly, stair-like lines that may appear at the edge of a character depicted with slanting lines, which are called 'jaggies', are changed to smooth straight or curved lines. Japanese Patent document JP-A-2004-287964 discloses a technique for performing anti-aliasing by use of hardware.

Generally, anti-aliased image data is temporarily stored in a Video Random Access Memory (VRAM) and then read from the VRAM to be displayed as an image on a display. When the display is capable of displaying an image by 16 gradations, each pixel has a value expressed by a 4-bit stream. Generally, a memory is configured to accept a 32-bit stream for a single writing process. If image data is written in a memory for each pixel (i.e. data is written by 4 bits), memory accesses have to occur frequently and thus writing data of a whole image in the memory takes considerable time to complete.

Alternatively, 32-bit data including pixel values for 8 pixels is written in a memory after performing of anti-aliasing for the 8 pixels, to reduce the number of memory accesses. In the latter case, the accessing time for writing data in the memory is shorter than in the former case. However, a significant amount of time is spent in performing the anti-aliasing 8 times before data can be written in the memory.

SUMMARY

In an aspect of the present invention, there is provided an image processing device comprising: a plurality of counters that extract image blocks, each of which includes a predetermined number of pixels from input image data, count a number of pixels having a predetermined value for each of the image blocks, calculate a pixel value for each of the extracted image blocks, and output a plurality of bit streams each of which represents the counted number for a respective image block, the number of the plurality of counters being larger than a bit length defined for a single writing process with the memory divided by the bit length of a value calculated for an image block; a converter that converts the bit streams output from the plurality of counters, by adjusting a bit length of the bit streams for writing in the memory, and outputs the converted bit streams; and a synthesizer that synthesizes the plurality of bit streams output from the converter to generate a bit stream having the bit length defined for a single writing process with the memory, and outputs the generated bit stream.

Preferably, the image processing circuit further comprises a selector that selects a first or second operation mode, in which a number of pixels included in an image block extracted in the first operation mode is larger than a number of pixels included in an image block extracted in the second mode, wherein: the number of the plurality of counters is larger than the bit length defined for a single writing process with the memory divided by a bit length of a value which is calculated for an image block in the second operation mode; each of the plurality of counters extracts an image block, the extracted image block including pixels, the number of the pixels in an image block being determined based on an operation mode selected by the selector, counts a number of pixels having the predetermined value in the extracted image block, and outputs a bit stream which represents the counted number; and the converter converts the bit length of the bit streams output from the counters by adjusting the bit length of the bit streams for writing in the memory, the adjusted bit length being determined by the operation mode selected by the selector, and outputs the converted bit streams.

Preferably, a part of the plurality of counters extracts image blocks each of which includes pixels, the number of the pixels in an image block being determined in the operation mode selected by the selector, counts a number of pixels having a predetermined value for each of the extracted image blocks, and outputs bit streams each of which represents a counted number of a respective image block, the number of the part of the plurality of counters being equal to the bit length defined for a single writing access with the memory divided by a bit length calculated for an image block in the first operation mode; and another part of the plurality of counters, upon selection of the second operation mode, extracts image blocks each of which includes pixels, the number of the pixels in an image block being determined in the second operation mode, counts a number of pixels having a predetermined value for each of the extracted image blocks, and outputs bit streams each of which represents a counted number of an image block.

Preferably, the counter outputs either bit streams converted using a conversion table in which bit streams output from the plurality of counters and bit streams adapted for writing in the memory are stored correspondingly, or bit streams converted by a clipping circuit for converting a bit length of an input bit stream to generate an output bit stream having a predetermined bit length adapted for writing in the memory.

In another aspect of the invention, there is provided a displaying apparatus comprising: a plurality of counters that extract image blocks each of which includes a predetermined number of pixels from input image data, count a number of pixels having a predetermined value for each of the image blocks, calculate a pixel value for each of the extracted image blocks, and output a plurality of bit streams each of which represents the counted number for a respective image block, the number of the plurality of counters being larger than a bit length defined for a single writing process with the memory divided by the bit length of a value calculated for an image block; a converter that converts the bit streams output from the plurality of counters, by adjusting a bit length of the bit streams for writing in the memory, and outputs the converted bit streams; a synthesizer that synthesizes the plurality of bit streams output from the converter to generate a bit stream having the bit length defined for a single writing process with the memory, and outputs the generated bit stream; and a display that displays an image based on data stored in the memory.

In yet another aspect of the invention, there is provided a printing apparatus comprising: a plurality of counters that extract image blocks each of which includes a predetermined number of pixels from input image data, count a number of pixels having a predetermined value for each of the image blocks, calculate a pixel value for each of the extracted image blocks, and output a plurality of bit streams each of which represents the counted number for a respective image block, the number of the plurality of counters being larger than a bit length defined for a single writing process with the memory divided by the bit length of a value calculated for an image block; a converter that converts the bit streams output from the plurality of counters, by adjusting a bit length of the bit streams for writing in the memory, and outputs the converted bit streams; a synthesizer that synthesizes the plurality of bit streams output from the converter to generate a bit stream having the bit length defined for a single writing process with the memory, and outputs the generated bit stream; and a printer unit that prints out an image based on data stored in the memory.

BRIEF DESCRIPTION OF THE DRAWINGS

The invention will be described with reference to the accompanying drawings, wherein like numbers refer to like units.

FIG. 3 shows a Conversion table Ta;

FIG. 4 shows a Conversion table Tb;

DESCRIPTION OF EXEMPLARY EMBODIMENTS

EXAMPLE

Figure 1:
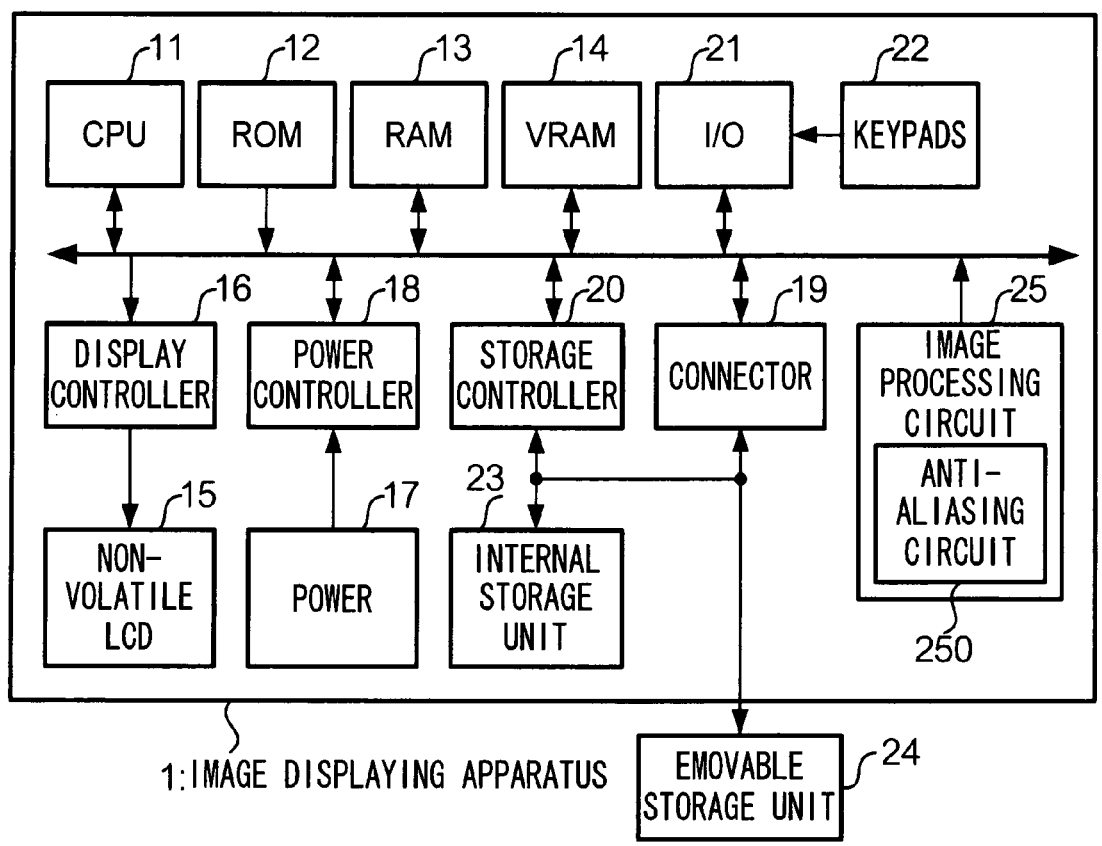
FIG. 1 shows a configuration of Image displaying apparatus 1.

FIG. 1 shows a configuration of an image display apparatus 1 according to the first example. As shown in the figure, Image displaying apparatus 1 includes a Central Processing unit (CPU) 11, Read Only Memory (ROM) 12, Random Access Memory (RAM) 13, Video Random Access Memory (VRAM) 14, volatile liquid crystal display (LCD) 15, display controller 16, power 17, power controller 18, connector 19, storage controller 20, I/O 21, keypad 22, internal storage unit 23, and image processing circuit 25. A CPU 11 reads a control program from ROM 12 and transfers it to RAM 13 to perform processing in accordance with procedures instructed by the program. Keypad 22 is a controller to be used by a user, including a pen type input device. I/O 21 monitors operation of Keypad 22, so as to output a signal in response to a user's input to CPU 11. Power 17 is, for example, a rechargeable battery. Power controller 18 manages information related to power to perform switching on/off of the power and monitoring residual power, and the like.

A Portable storage unit 24 such as a removable storage medium may be detachably connected via Connector 19. Portable storage unit 24 may be a flash memory such as a Secure Digital Card (SD Card) or other card-shape storage medium, or a disk-shaped magnetic storage medium such as a flexible disk. Internal storage unit 23 is a volatile storage medium such as a flash memory or hard disk integrated in Image displaying apparatus 1. Image data representing an image that may include text, graphics, photo image, or the like is stored in Internal storage unit 23 or Portable storage unit 24. The image data is comprised of a series of bits "0" or "1", the values "0" and "1" representing white pixel and black pixel, respectively. Storage controller 20, under control of CPU 11, reads the image data from Internal storage unit 23 or Portable storage unit 24 and outputs the data to Image processing circuit 25.

Image processing circuit 25 includes an Anti-aliasing circuit 250. Image processing circuit 25 performs, under control of CPU 11, anti-aliasing on input image data by Anti-aliasing circuit 250, and stores the anti-aliased image data in VRAM 14. VRAM 14 is a storage medium that stores image data of an image to be displayed on Volatile LCD 15. VRAM 14 is configured to receive image data by a unit of 32 bits. Hereinafter, the data unit is referred to as a writing data unit. Volatile LCD 15 is a displaying apparatus employing a cholesteric liquid crystal or charged particles movable by electrophoresis, which can continue to display an image after power supply to the displaying apparatus is cut. Image data written in VRAM 14 is supplied to Display controller 16 under control of CPU 11. Display controller 16 causes Volatile LCD 15 to display an image of the supplied image data on volatile LCD 15.

Figure 2:
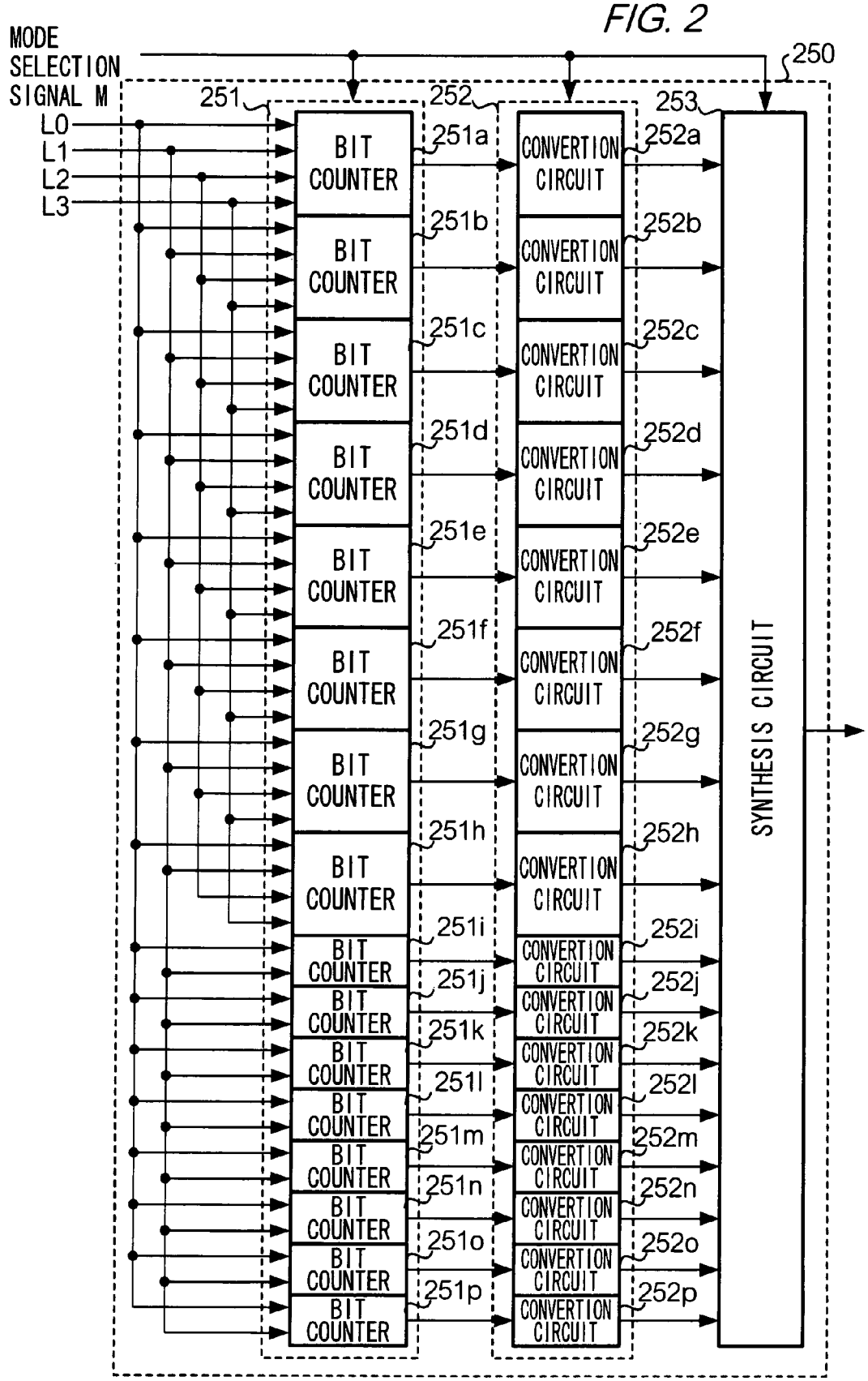
FIG. 2 shows a configuration of Anti-aliasing circuit 250.

Detailed description will now be given of a configuration of Anti-aliasing circuit 250. FIG. 2 shows a configuration of Anti-aliasing circuit 250. Anti-aliasing circuit 250 includes sixteen bit counters 251, corresponding sixteen conversion circuits 252, and a synthesis circuit 253. Each of Bit counters 251 and Conversion circuits 252 is operable independently of each other, so that a plurality of anti-aliasings can be performed in parallel in Anti-aliasing circuit 250.

Image displaying apparatus 1 can selectively be operated in the first or second operation mode. CPU 11 determines an operation mode designated by a user. CPU 11 supplies a mode selection signal M corresponding to the selected operation mode to Anti-aliasing circuit 250. Anti-aliasing circuit 250 performs processing in accordance with an operation mode represented by the input mode selection signal M. When the mode selection signal representative of the first operation mode is input, Anti-aliasing circuit 250 extracts from input image data eight regions (hereinafter referred to as image blocks), each of which includes sixteen pixels within a matrix of 4*4. Anti-aliasing circuit 250 calculates a 4-bit pixel value for each of the image blocks based on values of the pixels within the extracted image block. Accordingly, 4-bit pixel values for the eight image blocks are output to generate a 32-bit stream. When the mode selection signal representative of the second operation mode is input, Anti-aliasing circuit 250 extracts from input image data sixteen image blocks, each of which includes four pixels within a matrix of 2*2. Anti-aliasing circuit 250 calculates, based on values of the pixels within the extracted image block, a value based on 2 bits to a pixel value for the image blocks. Accordingly, the 2-bit pixel values for the image blocks are output to generate a 32-bit stream.

Description will now be directed to the number of Bit counters 251 provided in Anti-aliased circuit 250. In the exemplified embodiment, the number of Bit counters 251 is determined to be a bit length of the writing data unit of VRAM 14 divided by a bit length of a pixel value calculated for an image block (i.e. a pixel included in the output image data), so as to conform the amount of output data to the writing data unit of VRAM 14. For example, when Anti-aliasing circuit 250 is operating in the first operation mode, the bit length for a pixel of output image data is four, resulting in eight (=32/4) Bit counters 251 required. When Anti-aliasing circuit 250 is operating in the second operation mode, the bit length for a pixel of output image data is two, resulting in sixteen (=32/2) Bit counters 251 being required.

If eight Bit counters 251 necessary for an operation in the first operation mode and sixteen Bit counters 251 necessary for an operation in the second operation mode are provided separately, the overall circuit size and production cost will be high. In view of this, in the exemplified embodiment at least sixteen Bit counters 251a to 251p are provided. Of Bit counters 251a to 251p, eight Bit counters 251a to 251h are shared for operations performed in the first and second operation modes, while the remaining Bit counters 251i to 251p are activated only for an operation in the second operation mode.

Each Bit counter 251 extracts an image block from an input image data according to a selected operation mode, calculates a number of pixels having a value "1" in the image block, and outputs the calculated number. For example, in the first operation mode Bit counters 251a to 251h extract an image block of 4*4 matrix which includes sixteen pixels from the input image data, and output a number of pixels having value "1", resulting in a value which may be from "0" to "16", the number being expressed by 5 bits. Each of Conversion circuits 252 correspond to a respective Bit counter of Bit counters 251a to 251p. Conversion circuits 252 have a memory which is not shown in the figures, and convert, based on a conversion table stored in the memory, bit streams output from Bit counters 251 into bit streams having a length determined by the selected operation mode. Conversion counters 252a to 252h provided subsequent to Bit counters 251a to 251h have conversion tables Ta and Tb, which are used for performing operations in the first and second operation modes, respectively. Conversion circuit 252i to 252p provided subsequent to Bit counters 251i to 251p have only a Conversion table Tb used for operation in the second operation mode, since Bit counters 251i to 251p are not operative in the first operation mode.

FIG. 3 shows details of Conversion table Ta. As shown in the figure, pixel values ("0" to "16" expressed by 5 bits; hereinafter referred to as input pixel values) which are output from Bit counters 251a to 251h in the first operation mode and pixel values ("0" to "15" expressed by 4 bits; hereinafter referred to as output pixel values) output from Anti-aliasing circuit 250 are stored in association with each other. For example, in the first operation mode, if a 5-bit stream output from a Bit counter 251 represents "0", the 5-bit stream is converted into a 4-bit stream representing "0". It is noted that if a 5-bit stream output from a Bit counter 251 represents "16", the 5-bit stream is converted into a 4-bit stream representing "15".

FIG. 4 shows Conversion table Tb. As shown in the figure, in Conversion table Tb input pixel values ("0" to "4" expressed by 3 bits) which are output from Bit counters 251a to 251p in the second operation mode, and output pixel values ("0" to "3" expressed by 2 bits) are stored in association with each other. For example, in the second operation mode, if a 3-bit stream output from a Bit counter 251 represents "0", the 3-bit stream is converted into a 2-bit stream representing "0". It is noted that if a 3-bit stream output from a Bit counter 251 represents "4", the 3-bit stream is converted into a 2-bit stream representing "3".

Synthesis circuit 253 synthesizes bit streams output from Conversion circuits 252, to output a single bit stream. For example, in the first operation mode, a 32-bit stream is generated and output based on eight 4-bit streams output from Conversion circuits 252a to 252h. In the second operation mode, a 32-bit stream is generated and output based on sixteen 2-bit streams output from Conversion circuits 252a to 252p. CPU 11 writes a 32-bit stream output from Synthesis circuit 253 in VRAM 14 in a single writing process.

An operation of the exemplified embodiment will now be described. It is noted that a user is able to select a first or second operation mode according to an image that the user wishes to display on Volatile LCD 15. For example, when the user wishes to display a photo image or other graphic images, the user may select the first operation mode. When the user wishes to display a text or other characters, the user may select the second operation mode. Upon selection of an operation mode via user's operating Keypad 22, I/O 21 supplies a signal representative of the operation to CPU 11. CPU 11 determines the requested operation mode based on the received signal, and instructs Image processing circuit 25 to perform processing in the determined operation mode. Image processing circuit 25, under control of CPU 11, supplies a mode selection signal M representative of the selected operation mode to Bit counters 251, Conversion counters 252, and Synthesis circuit 253. Description will now be directed to operations of Anti-aliasing circuit 250.

Operation in the First Operation Mode

Figure 5:
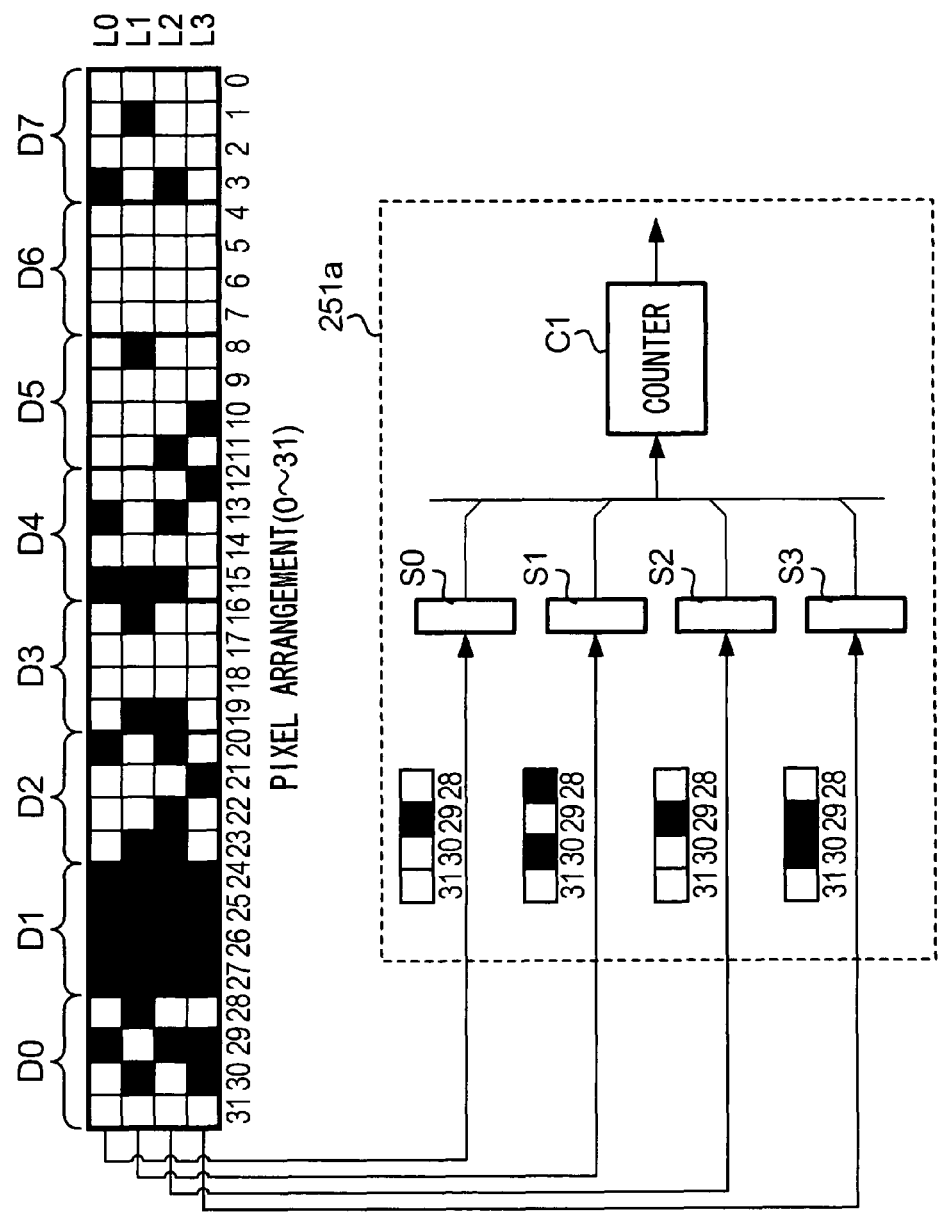
FIG. 5 shows processing by bit counters 251a-251h in first operation mode.

The operation of Anti-aliasing circuit 250 in the first operation mode will now be described. FIG. 5 illustrates an operation of Bit counters 251a to 251h in the first operation mode. In FIG. 5, image data including pixels within 4 lines and 32 columns is described. Lines are identified with "0th" to "3rd" from top to bottom, while columns are identified with "1st" to "32nd" from right to left. Positions of pixels can be identified using "0" to "31" from right to left. In the following description, the bit stream representing values of the pixels in the 0th line is referred to as a bit stream L0. Likewise, the bit streams representing values of the pixels in the 1st to 3rd lines are referred to as bit streams L1, L2, and L3, respectively. Sixteen pixels within 0th to 3rd lines and 28th to 31st columns are referred to as an image block D0. Another sixteen pixels within 0th to 3rd lines and 24th to 27th columns are referred to as an image block D1. Likewise, image blocks corresponding to a pixel group defined by shifting a pixel position by 4 are referred to as image blocks D2, D3, D4, D5, D6, and D7, respectively.

In the first operation mode, each of Bit counters 251a to 251h extracts from input image data a respective image block which includes sixteen pixels within 4 lines and 4 columns. Specifically, Image blocks D1, D2, D3, D4, D5, D6, and D7 are extracted by Bit counters 251a, 251b, 251c, 251d, 251e, 251f, 251g, 251h, respectively. Next, each of Bit counters 251a to 251h counts a number of pixels having a value "1" within pixels included in the extracted image block.

More specifically, four selectors S0 to S3 and a counter C1 are provided with each of Bit counters 251a to 251h. Bit streams L0, L1, L2, and L3 are input to Selectors S0, S1, S2, and S3, respectively. Next, each of Selectors S0, S1, S2, and S3 selects a bit stream portion corresponding to 4 pixel positions from the input bit stream. Selectors S0 to S3 provided with Bit counter 251a select bit streams corresponding to pixel positions 28 to 31 from the input 32 pixels and output the selected bit streams. Specifically, Selector S0 outputs four values of the pixels in the 0th line (i.e. Bit stream L0) and columns 28 to 31. Likewise, Selectors S1 to S3 output four values of the pixels in the 1st line and columns 28 to 31, four values of the pixels in the 1st line and columns 28 to 31, four values of the pixels in the 3rd line and columns 28 to 31, respectively. In this way, Bit counter 251a extracts, from input image data including values of pixels within 4 lines and 32 columns, Image block D0 which includes sixteen pixels within 4 lines and 4 columns.

Bit streams output from Selectors S0 to S3 are input to Counter C1. Counter C1 counts a number of the pixels having value "1", which means the pixels are colored black, within the pixels included in Image block D0. In an example shown in FIG. 5, since there are six black pixels in Image block D0, counter C1 outputs a 5-bit bit stream representing "6", which is the number of black pixels, as a pixel value of Image block D0. The reason the output bit stream comprises 5 bits is that the number of block pixels per Image block can take from "0" to "16", thus 5 bits are necessary to express all the possible cases.

Similarly to Bit counter 251a, Bit counters 251b-251h extract Image blocks D1 to D7 from the input image data, respectively, and output 5-bit streams representing the number of pixels having value "1". In an example shown in FIG. 5, since the numbers of block pixels in the image blocks D1 to D7 are 16, 6, 3, 6, 3, 0, and 3, the output bit streams represent "16", "6", "3", "6", "3", "0", and "3", respectively. Processing by Bit counters 251a to 251h are performed independently.

Conversion circuits 252, using Conversion table Ta which is activated in the first operation mode, convert bit streams output from Bit counter 251a to 251h to bit streams which comprise 4 bits, so as to conform bit lengths for output in the first operation mode. For example, a 5-bit stream representing "6" is input from Bit counter 251a to Conversion circuit 252a. Conversion circuit 252a finds output image data, which is "6", associated with input image data "6" in Conversion table Tb shown in FIG. 3, and outputs a 4-bit stream representing "6". A 5-bit stream representing "16" is input from Bit counter 251b to Conversion circuit 252b. Conversion circuit 252b, finds output image data, which is "15", associated with input image data "6" in Conversion table Tb shown in FIG. 3, and outputs a 4-bit stream representing "15". In the case a pixel value "16" is changed to "15", an output black pixel is slightly lighter than expected.

Likewise, Conversion circuits 252c to 252h output 4-bit streams representing "6", "3", "6", "3", "0", and "3", which are corresponding to the input signals representing input values of "6", "3", "6", "3", "0", and "3". Processing of Conversion circuits 252a to 252h are performed independently. It is noted that Bit counters 251i to 251p and Conversion circuits 252i to 252p are not active in the first operation mode.

Synthesis circuit 253 connects the 4-bit streams output from Conversion circuit 252a to 252h, so as to output a 32-bit stream. In the exemplified embodiment, synthesis circuit 253 outputs a 32-bit stream "011011110110 . . . 0011" based on input 4-bit streams "0110", "1111", "01110", . . . , and "0011".

The 32-bit stream output from synthesis circuit 253 is then written in VRAM 14 in a single accessing process, under control of CPU 11. Likewise, other 32-bit streams generated based on other pixels of the original image are written in VRAM 14. The bit streams relating to the image accumulated in VRAM 14 are supplied to Display controller 16, so as to be displayed in Volatile LCD 15.

Figure 6:
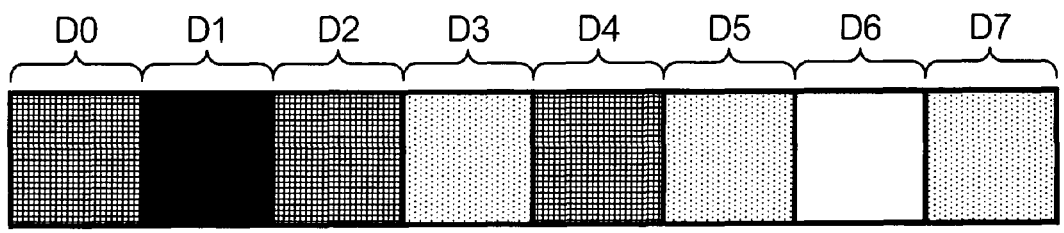
FIG. 6 shows an image displayed on a Non-volatile LCD 15 in the first operation mode.

FIG. 6 shows an image displayed on Volatile LCD 15 based on the bit streams stored in VRAM 14. As shown in FIG. 6, the output image includes image blocks, each image block being colored with a color between black and white, the color being determined based on the number of the black pixels included in the image block of the original image shown in FIG. 5.

2. Operation in the Second Operation Mode

Figure 7:
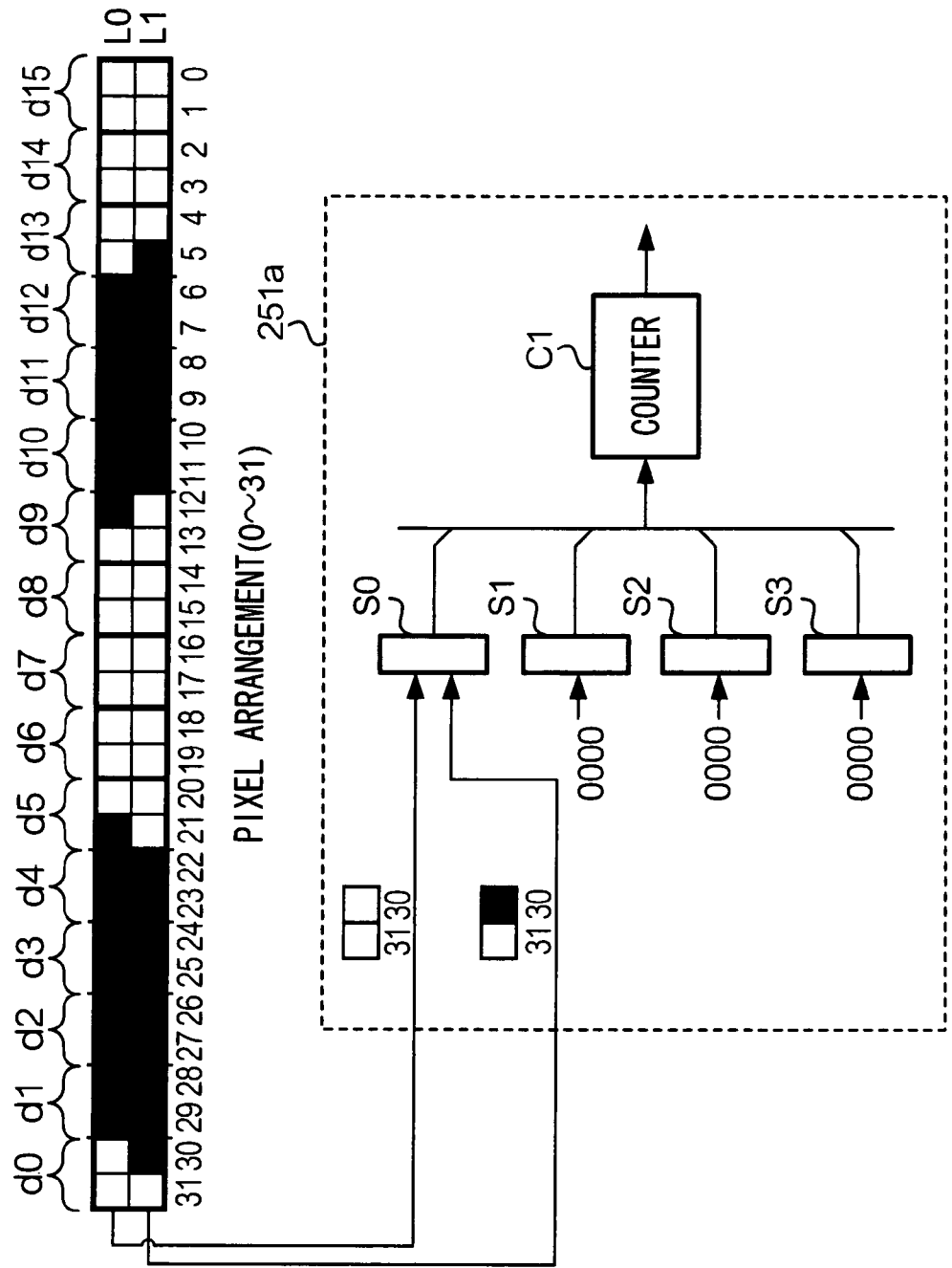
FIG. 7 shows processing by bit counters 251a to 251h in the second operation mode.
Figure 8:
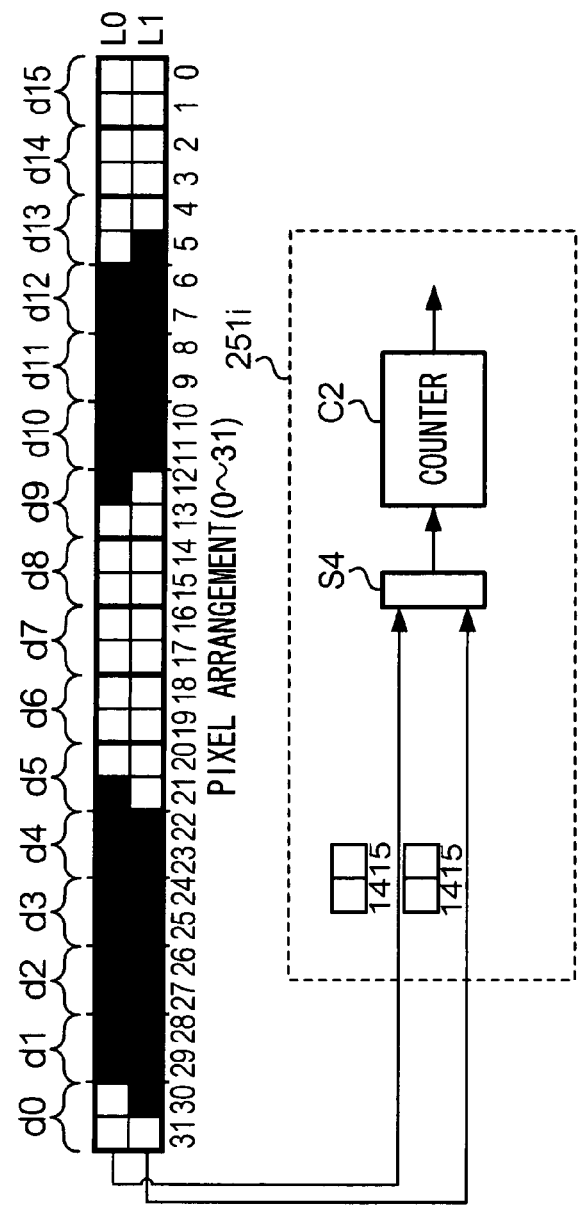
FIG. 8 shows processing by bit counters 251i-251p in the second operation mode.

An operation of Anti-aliasing circuit 250 in the second operation mode will now be described. FIGS. 7 and 8 show operations of Bit counter 251a to 251h and Bit counter 251i to 251p in the second operation mode, respectively. In FIG. 5, image data including pixels within 2 lines and 32 columns is described. Lines are identified with "0th" to "3rd" from top to bottom, while columns are identified with "1st" to "32nd" from right to left. Positions of pixels are identified by "0" to "31" from right to left. In the following description, a region including four pixels within 30th and 31st columns is referred to as an image block d0. The next group of four pixels within 28th to 29th columns is referred to as an image block d1. Likewise, image blocks of corresponding pixel groups defined by shifting a pixel position by 2 are referred to as image blocks d2, d3, . . . , and d15, respectively.

In the second operation mode, each of Bit counters 251a to 251h extracts, from input image data, an image block including sixteen pixels within 4 lines and 4 columns. Specifically, Image blocks d1, d2, d3, d4, d5, d6, d7, d8, d9, d10, d11, d12, d13, d14, and d15 are extracted by Bit counters 251a, 251b, 251c, 251d, 251e, 251f, 251g, 251h, 251i, 251j, 251k, 251l, 251m, 251n, and 251o, respectively.

Next, each of Bit counters 251a to 251h counts a number of pixels having value "1" within pixels included in a respectively extracted image block. Specifically, Selector S0 provided with Bit counter 251a selects bit streams corresponding to Pixel positions 30 to 31 from the input 32 pixels and outputs the selected bit streams, as shown in FIG. 7. Accordingly, Selector S0 outputs two values of the pixels in the 0th line (i.e. Bit stream L0) and two values of the pixel in the 1st line (Bit stream L1), which are within columns 30 to 31. Selectors S1 to S3 output bit streams representing "0". In this way, Bit counter 251a extracts, from input image data including values of pixels within 2 lines and 32 columns, Image block d0, which includes four pixels within 2 lines and 2 columns.

Bit streams output from Selectors S0 to S3 are input to Counter C1. Counter C1 counts a number of pixels having value "1", which means the pixels are colored black, within the four pixels included in Image block d0. In an example shown in FIG. 7, since there is one black pixel in Image block d0, counter C1 outputs a 3-bit stream representing "1", which is equal to the number of black pixels, as a pixel value of Image block d0. The reason the output bit stream comprises 3 bits is that the number of black pixels per Image block can take from "0" to "4", thus 3-bit streams are necessary to express all the possible cases.

Similarly to Bit counter 251a, Bit counters 251b to 251h extract Image block d1 to d7 from the input image data, respectively, and output 3-bit streams representing the number of pixels having value "1" included in image blocks d1 to d7, respectively. In the example shown in FIG. 7, since the numbers of pixels colored black in the image blocks d1 to d7 are 4, 4, 4, 4, 1, 0, and 0, the output bit streams represent "4", "4", "4", "4", "1", "0", and "0", respectively.

Each of Bit counters 251i to 251p shown in FIG. 8 has a selector S4 and counter C2, which is different from Bit counters 251a to 251h. Bit streams L0 and L1 which represent image data of 0th and 1st line, respectively, are input to Selector S4. Selector S4 selects bit streams corresponding to Pixel positions 30 to 31 from the input 32 pixels and outputs the selected bit streams. Accordingly, Selector S4 outputs two values of the pixels in the 0th line (i.e. Bit stream L0) and two values of the pixel in the 1st line (Bit stream L1), which are within columns 30 to 31. In this way, Bit counter 251a extracts, from input image data including values of pixels within 2 lines and 32 columns, Image block d8 which includes four pixels within 2 lines and 2 columns.

Bit streams output from Selector S4 are input to Counter C2. Counter C2 counts a number of the pixels having value "1", which means the pixels are colored black, within the pixels included in Image block d8. In the example shown in FIG. 8, since there is no pixel colored black in Image block d8, counter C2 outputs a 3-bit bit stream representing a pixel value "0".

Similarly to Bit counter 251i, Bit counters 251j-251p extract Image blocks d1 to d15 from the input image data, respectively, and output 3-bit stream representing the number of pixels having value "1". In the example shown in FIG. 8, since the numbers of block pixels in the image blocks d9 to d15 are 1, 4, 4, 4, 1, 0, and 0, the output bit streams represent "1", "4", "4", "4", "1", "0", and "0", respectively. Processing by Bit counters 251a to 251h are performed independently.

Conversion circuits 252, using Conversion table Tb, when receiving mode selection signal M representative of the second operation mode, convert the bit streams output from Bit counter 251a to 251p to bit streams which comprise 2 bits, so as to conform bit lengths for output in the second operation mode. In the example shown in FIGS. 7 and 8, a 5-bit stream representing "1" is input from Bit counter 251a to Conversion circuit 252a. Conversion circuit 252a, finds output image data, which is "1", associated with input image data "1" in Conversion table Tb shown in FIG. 4, and outputs a 2-bit stream representing "1". A 3-bit stream representing "4" is input from Bit counter 251b to Conversion circuit 252b. Conversion circuit 252b, locates output image data, which is "3", associated with input image data "4" in Conversion table Tb shown in FIG. 3, and outputs a 2-bit stream representing "3". In the case that a pixel value "4" is changed to "3", an output black pixel is slightly lighter than it is expected.

Similarly to Conversion circuits 252a and 252b, Conversion circuits 252c to 252p output 2-bit streams representing "4", "4", . . . , and "0" corresponding to the input signals representing input values of "3", "3", . . . , and "0". Processing of Conversion circuits 252a to 252h are performed independently. It is noted that Bit counters 251i to 251p and Conversion circuits 252i to 252p are not in active in the first operation mode. Processing of each of Conversion circuits 252a and 252p is performed independently.

Synthesis circuit 253 connects the 2-bit streams output from Conversion circuits 252a to 252p, to output a 32-bit stream. In the exemplified embodiment, Synthesis circuit 253 outputs a 32-bit stream "011111 . . . 00" based on input 2-bit streams "01", "11", "11", . . . , and "0", which represent 1, 3, 3, . . . , and 0, respectively.

The 32-bit stream output from synthesis circuit 253 is then written in VRAM 14 in a single accessing process under control of CPU 11. Likewise, other 32-bit streams generated based on other pixels of the original image are written and stored in VRAM 14. The bit streams relating to the image stored in VRAM 14 are supplied to Display controller 16, so as to be displayed on Volatile LCD 15.

Figure 9:
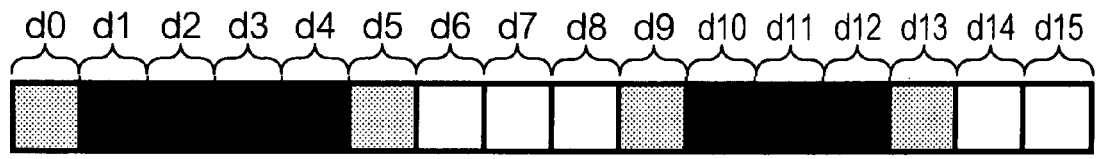
FIG. 9 shows an image displayed on a Non-volatile LCD 15 in the second operation mode.

FIG. 9 shows an image displayed on Volatile LCD 15 based on the bit streams stored in VRAM 14. As shown in FIG. 9, regions corresponding to the edges of the slanted lines (i.e. d0, d5, d9 and d13) are colored gray, i.e. an intermediate color of black and white. In other words, stair-shape jaggies occurring in edges of slanted lines are smoothed.

In the example described above, it is possible to perform anti-aliasing on pixel groups in image data simultaneously and independently, and to write a result of the anti-aliasing in a memory in a single accessing process. Thus, less time is spent on displaying an image on Volatile LCD 15 based on input image data.

3. Modifications

Various modifications can be made to the example described above. The following are examples of modifications to the exemplified embodiment. The modifications may be applied independently or in combination.

Modification 1

In the exemplified embodiment, Conversion circuits 252 convert a bit length of a bit stream output from Bit counters 251 using the Conversion tables. It is possible to employ clipping circuits, so as to convert the bit length of bit streams output from Bit counters 251, the number being determined by a selected operation mode. A clipping circuit is operatively configured to convert an input value to a predetermined value for output. Specifically, in the first operation mode, the clipping circuit, upon receipt of a 5-bit stream that may take a value from "0" to "15", outputs a 4-bit stream representing a value the same as the input value. When a 5-bit stream represents "16", the clipping circuit outputs a 4-bit stream which represents "15". Similarly, in the second operation mode, the clipping circuit, upon receipt of a 3-bit stream that may take a value from "0" to "3", outputs a 2-bit stream representing a value the same as the input value. When a 3-bit stream represents "4", the clipping circuit outputs a 4-bit stream which represents "3". This modification has the same effect as the exemplified embodiment.

Modification 2

It is possible to employ other configurations for Bit counters 251. In the second operation mode of the exemplified embodiment, Selector S0 provided in Bit counter 251a selects pixels in Bit streams L0 and L1 and 30th and 31st columns from the input pixels in 0th through 31st columns. It is possible to input Bit streams L0 and L1 in Selectors S0 and S1, respectively, and Selectors S0 and S1 select pixels in columns 30 and 31. Accordingly, two values of the pixels in 0th line and columns 30 and 31 are output by Selector S0, and two values of the pixels in 1st line and columns 30 and 31 are output by Selector S1. Simply stated, any configurations can be adapted to Bit counter 251 for extracting an image block including a number of pixels, the number corresponding to an operation mode.

Modification 3

In the exemplified embodiment, Bit counters 251 count the number of pixels having value "1" within extracted image blocks and output a bit stream representing the counted number. Alternatively, it is possible to count the number of pixels having value "0" and output the number. This modification has the same effect as the exemplified embodiment. Simply stated, Bit counters 251 are operatively configured to count a number of pixels having a predetermined value.

Modification 4

In the above example, VRAM 14 is configured to accept 32 bit in a single writing process, however, VRAM 14 may be configured to accept 64 bit or other bits in a single writing process. In the exemplified embodiment image processing circuit 25 stores anti-aliased data in VRAM 14, however, it is possible to output the anti-aliased data to another storage unit such as ROM 13 or a flash memory to store it.

In the above exemplified embodiment Anti-aliasing circuit 250 extracts image blocks including sixteen pixels within 4 lines and 4 columns from input image data, and outputs a 4-bit stream for each of the image blocks in the first operation mode, whereas in the second operation mode it extracts image blocks including four pixels within 2 lines and 2 columns from input image data, and outputs a 2-bit stream for each of the image blocks. The number of pixels included in an extracted image block and the number of bits (bit length) of an output bit stream are not limited to those of the exemplified embodiment. Writing data unit, the number of pixels included in an extracted image block, and a bit length calculated for a pixel of an output image data may take values different from those described in the exemplified embodiment.

Simply stated, the invention employs the configuration described below. CPU 11 selects either a first or second operation mode, wherein the number of pixels included in an image block extracted in the first operation mode may be larger than one extracted in the second mode. Bit counters 251 are provided, the number of Bit counters 251 is larger than a bit length of a writing unit of a memory divided by a bit length of a pixel value of an image block. A part of Bit counters 251 operative in first operation mode, whose number is determined to be a bit length of a writing unit of the memory divided by a bit length of a value of an image block, extracts image blocks including pixels, the number of the pixel determined by an operation mode selected by CPU 11. The part of Bit counters 251 then counts the number of the pixels having a predetermined value and outputs bit streams representing the counted number. The other part of Bit counters 251, when selecting the second operation mode, extracts image blocks determined by the second operation mode, counts the number of the pixels having the predetermined value, and outputs bit streams representing the counted number.

Modification 5

In the above-exemplified embodiment, Anti-aliasing circuit 250 is provided in Image processing circuit 25. It is possible to provide Anti-aliasing circuit 250 in Display controller 16 or other devices. This modification has the same effect as the exemplified embodiment.

Modification 6

In the above exemplified embodiment, Conversion table Ta defines a relationship between input pixel values and output values where output pixel values "0" to "15" are associated with output pixel values. "0" to "15", respectively, and input pixel value "16" is associated with output value "15". However, other associations can be employed. Similarly, association defined in Conversion table Tb can be changed. Adjustment of the values stored in the tables will effect expression of a viewer viewing an image displayed on Volatile LCD 15.

Modification 7

In the above-exemplified embodiment, bit streams stored in VRAM 14 are supplied to Volatile LCD as image data of an image to be displayed on Volatile LCD 15, and Volatile LCD 15 displays an image based on the supplied image data. Alternatively, it is possible to print out an image based on anti-aliased image data. For example, a 32-bit stream output from Synthesis circuit 253 is written in RAM 13 and accumulated bit streams relating to an image are supplied to a printing device as image data for printing on a sheet. The printing device prints out the image based on the supplied data. This modification has the same effect as the exemplified embodiment.

What is claimed is:

1. An image processing circuit comprising:
   a plurality of counters that extract image blocks each of which includes a predetermined number of pixels from input image data, count a number of pixels having a predetermined value for each of the image blocks, calculate a pixel value for each of the extracted image blocks, and output a plurality of bit streams each of which represents the counted number for a respective image block, the number of the plurality of counters being larger than a bit length defined for a single writing process with memory divided by the bit length of a value calculated for an image block;
   a converter that converts the bit streams output from the plurality of counters, by adjusting a bit length of the bit streams for writing in the memory, and outputs the converted bit streams;
   a synthesizer that synthesizes the plurality of bit streams output from the converter to generate a bit stream having the bit length defined for a single writing process with the memory, and outputs the generated bit stream;
   a selector that selects a first or second operation mode, in which a number of pixels included in an image block extracted in the first operation mode is larger than a number of pixels included in an image block extracted in the second mode, wherein:
      the number of the plurality of counters is larger than the bit length defined for a single writing process with the memory divided by a bit length of a value which is calculated for an image block in the second operation mode;
      each of the plurality of counters extracts an image block, the extracted image block including pixels, the number of the pixels in an image block being determined based on an operation mode selected by the selector, counts a number of pixels having the predetermined value in the extracted image block, and outputs a bit stream which represents the counted number; and
      the converter converts the bit length of the bit streams output from the counters by adjusting the bit length of the bit streams for writing in the memory, the adjusted bit length being determined by the operation mode selected by the selector, and outputs the converted bit streams.

2. The image processing circuit according to claim 1, wherein:
   a part of the plurality of counters extracts image blocks each of which includes pixels, the number of the pixels in an image block being determined in the operation mode selected by the selector, counts a number of pixels having a predetermined value for each of the extracted image blocks, and outputs bit streams each of which represents a counted number of a respective image block, the number of the part of the plurality of counters being equal to the bit length defined for a single writing process with the memory divided by a bit length calculated for an image block in the first operation mode; and
   another part of the plurality of counters, upon selection of the second operation mode, extracts image blocks each of which includes pixels, the number of the pixels in an image block being determined in the second operation mode, counts a number of pixels having a predetermined value for each of the extracted image blocks, and outputs bit streams each of which represents a counted number of an image block.

3. The image processing circuit according to claim 1, wherein the counter outputs either bit streams converted using a conversion table in which bit streams output from the plurality of counters and bit streams adapted for writing in the memory are stored correspondingly, or bit streams converted by a clipping circuit for converting a bit length of an input bit stream to generate an output bit stream having a predetermined bit length adapted for writing in the memory.

4. A displaying apparatus comprising:
a plurality of counters that extract image blocks each of which includes a predetermined number of pixels from input image data, count a number of pixels having a predetermined value for each of the image blocks, calculate a pixel value for each of the extracted image blocks, and output a plurality of bit streams each of which represents the counted number for a respective image block, the number of the plurality of counters being larger than a bit length defined for a single writing process with memory divided by the bit length of a value calculated for an image block;
a converter that converts the bit streams output from the plurality of counters, by adjusting a bit length of the bit streams for writing in the memory, and outputs the converted bit streams;
a synthesizer that synthesizes the plurality of bit streams output from the converter to generate a bit stream having the bit length defined for a single writing process with the memory, and outputs the generated bit stream;
a display that displays an image based on data stored in the memory,
a selector that selects a first or second operation mode, in which a number of pixels included in an image block extracted in the first operation mode is larger than a number of pixels included in an image block extracted in the second mode, wherein:
  the number of the plurality of counters is larger than the bit length defined for a single writing process with the memory divided by a bit length of a value which is calculated for an image block in the second operation mode;
  each of the plurality of counters extracts an image block, the extracted image block including pixels, the number of the pixels in an image block being determined based on an operation mode selected by the selector, counts a number of pixels having the predetermined value in the extracted image block, and outputs a bit stream which represents the counted number; and
  the converter converts the bit length of the bit streams output from the counters by adjusting the bit length of the bit streams for writing in the memory, the adjusted bit length being determined by the operation mode selected by the selector, and outputs the converted bit streams.

5. A printing apparatus comprising:
a plurality of counters that extract image blocks each of which includes a predetermined number of pixels from input image data, count a number of pixels having a predetermined value for each of the image blocks, calculate a pixel value for each of the extracted image blocks, and output a plurality of bit streams each of which represents the counted number for a respective image block, the number of the plurality of counters being larger than a bit length defined for a single writing process with memory divided by the bit length of a value calculated for an image block;
a converter that converts the bit streams output from the plurality of counters, by adjusting a bit length of the bit streams for writing in the memory, and outputs the converted bit streams;
a synthesizer that synthesizes the plurality of bit streams output from the converter to generate a bit stream having the bit length defined for a single writing process with the memory, and outputs the generated bit stream;
a printer unit that prints out an image based on data stored in the memory;
a selector that selects a first or second operation mode, in which a number of pixels included in an image block extracted in the first operation mode is larger than a number of pixels included in an image block extracted in the second mode, wherein:
  the number of the plurality of counters is larger than the bit length defined for a single writing process with the memory divided by a bit length of a value which is calculated for an image block in the second operation mode;
  each of the plurality of counters extracts an image block, the extracted image block including pixels, the number of the pixels in an image block being determined based on an operation mode selected by the selector, counts a number of pixels having the predetermined value in the extracted image block, and outputs a bit stream which represents the counted number; and
  the converter converts the bit length of the bit streams output from the counters by adjusting the bit length of the bit streams for writing in the memory, the adjusted bit length being determined by the operation mode selected by the selector, and outputs the converted bit streams.

* * * * *